(12) United States Patent
Sekihara et al.

(10) Patent No.: US 8,015,994 B2
(45) Date of Patent: Sep. 13, 2011

(54) HYDRAULIC UNIT

(75) Inventors: Yasuhito Sekihara, Kariya (JP); Shin Sasaki, Okazaki (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 948 days.

(21) Appl. No.: 11/542,234

(22) Filed: Oct. 4, 2006

(65) Prior Publication Data

US 2007/0092361 A1    Apr. 26, 2007

(30) Foreign Application Priority Data

Oct. 20, 2005    (JP) ................ 2005-305370

(51) Int. Cl.
*F16K 27/12*    (2006.01)
(52) U.S. Cl. ....................... 137/377; 137/899
(58) Field of Classification Search ................ 137/377, 137/899; 220/359.1, 359.2; 156/230
See application file for complete search history.

(56) References Cited

U.S. PATENT DOCUMENTS

| 1,977,759 A * | 10/1934 | Ford ........................... 222/482 |
| 6,280,840 B1 * | 8/2001 | Luhmann et al. ............. 428/343 |
| 2003/0035933 A1 * | 2/2003 | Stahl ........................... 428/195 |

FOREIGN PATENT DOCUMENTS

| JP | 11-343468 A | 12/1999 |
| JP | 2002-53021 | 2/2002 |
| JP | 2002-210552 A | 7/2002 |
| JP | 2002-339903 | 11/2002 |

OTHER PUBLICATIONS

Notification of Reasons for Refusal dated Mar. 1, 2011 issued in the corresponding Japanese Patent Application No. 2005-305370 and English translation.

* cited by examiner

*Primary Examiner* — John Rivell
*Assistant Examiner* — Kevin Murphy
(74) *Attorney, Agent, or Firm* — Buchanan Ingersoll & Rooney PC

(57) ABSTRACT

A hydraulic unit is provided with a housing having two planar portions neighboring at a predetermined angle between them. At least one opening is formed on each of the planar portions. For example, one opening and at least two openings are formed on the two planar portions, respectively. A protective tape is adhered to the two planar portions of the housing for covering each opening formed on each of the two planar portions. The protective tape is cut by a laser beam, for example, to be separated into at least each one of a part for covering one opening and a part for covering at least two openings.

6 Claims, 9 Drawing Sheets

HYDRAULIC UNIT

This application claims priority under 35 U.S.C. Sec. 119 to No. 2005-305370 filed in Japan on Oct. 20, 2005, the entire content of which is herein incorporated by reference.

BACKGROUND

The present invention relates to a hydraulic unit such as a hydraulic pressure unit for vehicles, and more particularly to the hydraulic unit provided with a housing having at least one opening, and a protective tape adhered to it for covering the opening.

In general, as for the hydraulic unit such as the hydraulic pressure unit for vehicles, whose housing is formed with at least one opening or port, it has been known heretofore that a rubber plug is inserted into the opening, or a protective tape is adhered to cover the opening, so as to prevent obstacles from being introduced into the opening. With respect to the hydraulic pressure unit for vehicles, Japanese Patent Laid-open Publication No. 2002-339903 discloses an art capable of covering at least two openings of pipe connecting ports simultaneously, with a protective tape being adhered to outer surface of a housing, and explains it as follows. In its abstract, it is described as a first feature that the opening of the pipe connecting port conventionally protected by a plug solely is protected by a protection tape. And, it is described as a second feature that the single tape can simultaneously protect at least two or more openings. Furthermore, it is described that a perforated line for dividedly peeling the protection tape for every opening or for every group of the pipe connecting ports is provided therein, and that the perforated line is a finished part such as a scored line to be cut out along it.

With respect to the perforated line as described above, the Publication describes that it is preferable to provide the line with its intermediate part crossing either a first outer surface or a second outer surface, and arrange its opposite ends on the other outer surface than the one outer surface, or on a boarder zone between the first and second outer surfaces. Regarding its reason, it is described that in the initial stage where the protection tape is cut out, any unnecessary peeling force is not applied to the tape zone to be remained, so that unnecessary peeling can be avoided.

As for the hydraulic pressure unit as described above, it is required that the protective tape adhered to it for covering a plurality of openings can be separated into at least each one of a part for covering one opening and a part for covering at least two openings formed on the two planar portions, respectively, to be peeled off, in a process for installing the hydraulic pressure unit in the vehicle. Particularly, with respect to the housing of the hydraulic pressure unit for vehicles, in the case where at least one opening is formed on each of two neighboring planar portions, it is required to be constituted such that the protective tape adhered to it for covering those openings can be separated into at least each one of the parts easily and certainly, and can be removed.

According to the art as described in the above Publication, however, it has been proposed that the perforated line such as the scored line is provided in advance on the protection tape, and its arrangement is set in accordance with the relationship between the protection tape and the outer surface of the housing, so as to avoid the unnecessary peeling. This is aimed to solve the problem due to the perforated line, but stuck to the solution by means of solely the protection tape itself. Therefore, complicated perforated lines are to be provided in advance, and it is largely dependent on the finished state of the perforated lines or the like whether the unnecessary peeling can be avoided or not. Consequently, not only it is not necessarily easy to provide the perforated lines appropriately, but also workability for peeling is still doubtful.

SUMMARY

Accordingly, it is an object of the present invention to provide a hydraulic unit comprising a housing having neighboring two planar portions formed with at least one opening, respectively, and a protective tape adhered to the housing for covering the opening, to be capable of separating the protective tape adhered to the housing into at least each one of a part for covering one opening and a part for covering at least two openings, formed on the two planar portions, respectively, to be removed easily and certainly.

In accomplish the above and other objects, a hydraulic unit comprises a housing having two planar portions neighboring at a predetermined angle between the planar portions, with at least one opening being formed on each of the planar portions, and a protective tape adhered to the two planar portions of the housing for covering each opening formed on each of the two planar portions. The protective tape is cut to be separated into at least each one of a part for covering one opening and a part for covering at least two openings, wherein the one opening and at least two openings are formed on the two planar portions, respectively.

In the hydraulic unit, the protective tape is preferably provided with a grip portion formed integrally with each portion separated into at least each one part, to extend outward of the portion adhered to the two planar portions, respectively. The protective tape may be formed with the grip portion extending from opposite ends of the portion adhered to the two planar portions, in a direction to be apart from each other.

In the hydraulic unit, the protective tape may be formed in advance to provide a shape having a line for cutting each portion separated into at least each one part, to extend in a predetermined direction.

Or, The protective tape may be formed in advance to provide a shape having a straight line for cutting each portion separated into at least each one part.

As for a method for adhering a protective tape to a hydraulic unit provided with a housing having two planar portions neighboring at a predetermined angle between the planar portions, with at least one opening being formed on each of the planar portions, it may comprise the steps of adhering the protective tape to the two planar portions of the housing for covering each opening formed on each of the two planar portions, and cutting the protective tape to be separated into at least each one of a part for covering one opening and a part for covering at least two openings, formed on the two planar portions, respectively.

The protective tape may be cut by a laser beam on one planar portion out of the two planar portions, to be separated into at least each one part.

BRIEF DESCRIPTION OF THE DRAWINGS

The above stated objects and following description will become readily apparent with reference to the accompanying drawings, wherein like reference numerals denote like elements, and in which.

DETAILED DESCRIPTION OF EMBODIMENTS

Figure 1:
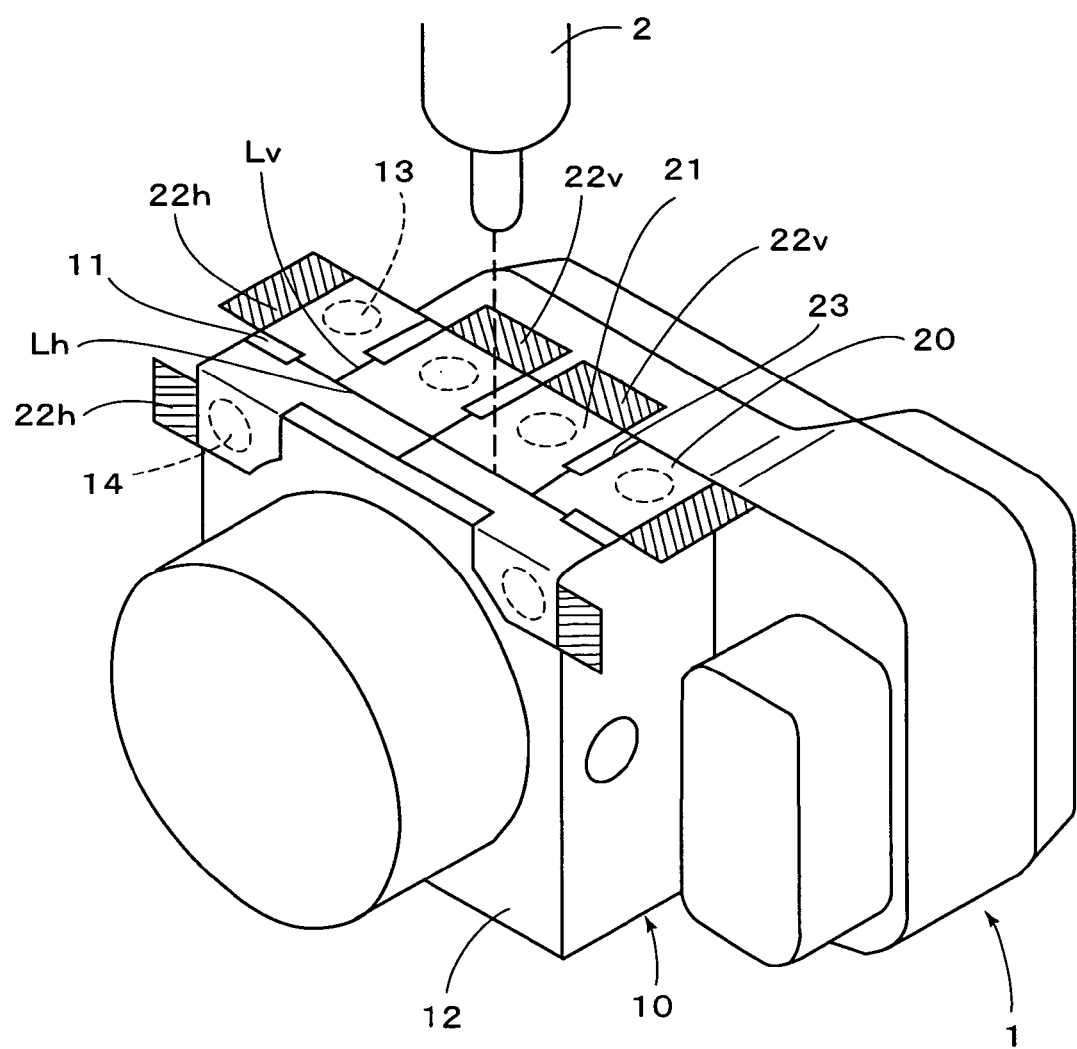
FIG. 1 is a perspective view of a hydraulic pressure unit for vehicles, with a protective tape adhered to it being cut into every separated part by means of a laser beam, according to an embodiment of the present invention.
Figure 2:
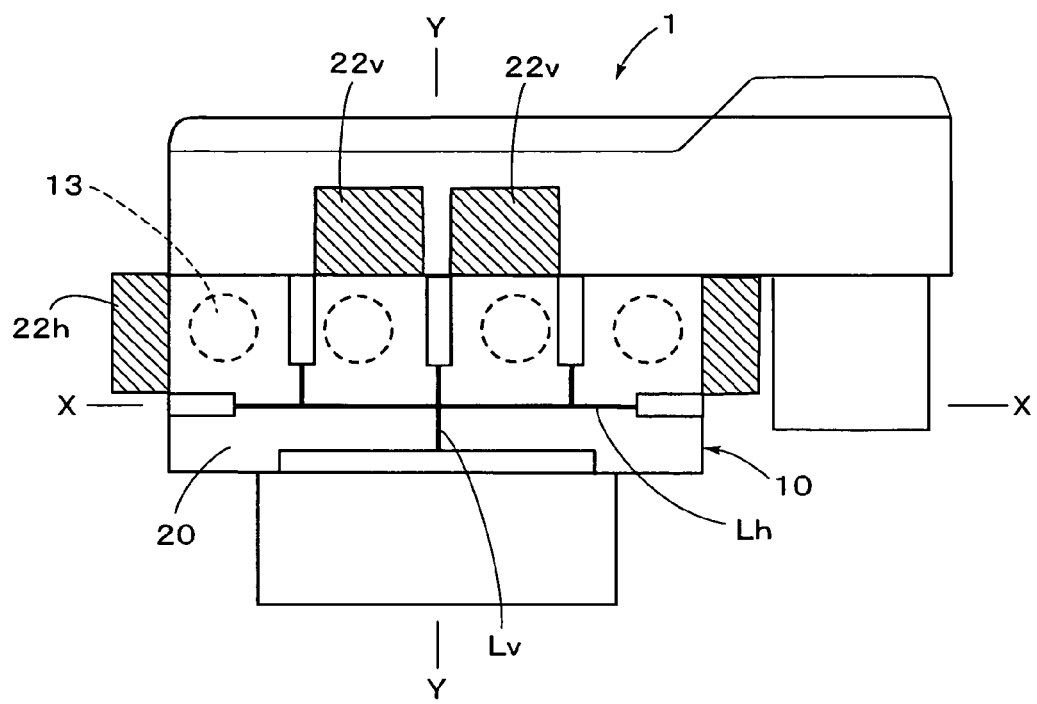
FIG. 2 is a plan view of a hydraulic pressure unit for vehicles, according to an embodiment of the present invention.
Figure 3:
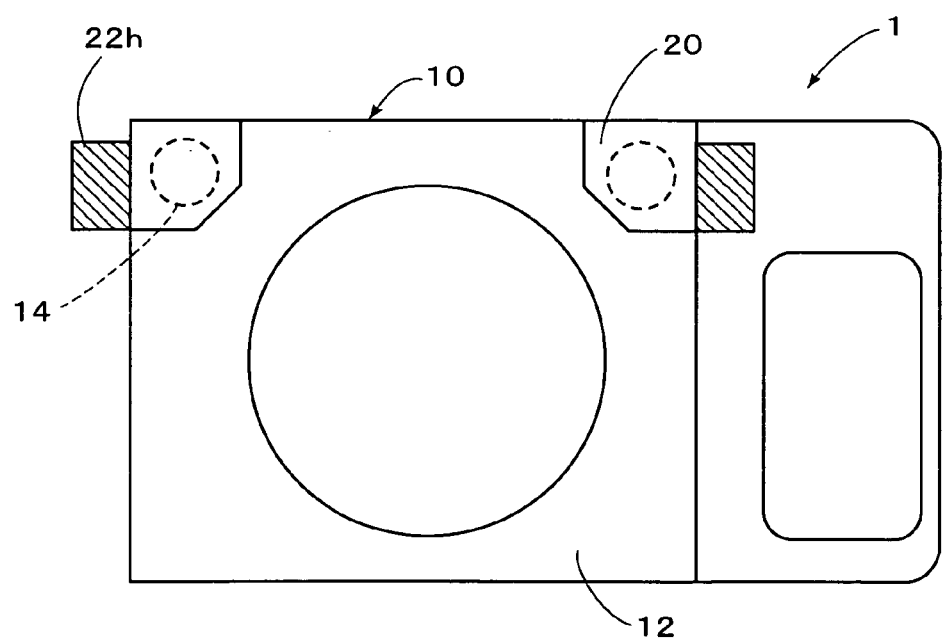
FIG. 3 is a front view of a hydraulic pressure unit for vehicles, according to an embodiment of the present invention.

Referring to FIGS. 1-3, there is illustrated a hydraulic pressure unit 1 for vehicles, which is served as a hydraulic unit according to an embodiment of the present invention, and which is provided for use in a brake control apparatus. A housing 10 of the hydraulic pressure unit 1 has two planar portions 11 and 12 neighboring at a predetermined angle between them, e.g., 90 degree according to the present embodiment. FIG. 1 illustrates such a state that a protective tape 20 adhered to the hydraulic pressure unit 1 is being cut into each separated part (represented by 21) by means of a laser beam. As indicated by broken lines in FIGS. 1-3, on each of the planar portions 11 and 12, there is formed at least one opening, which may be called as a port, and which is represented by 13 and 14, respectively.

Figure 4:
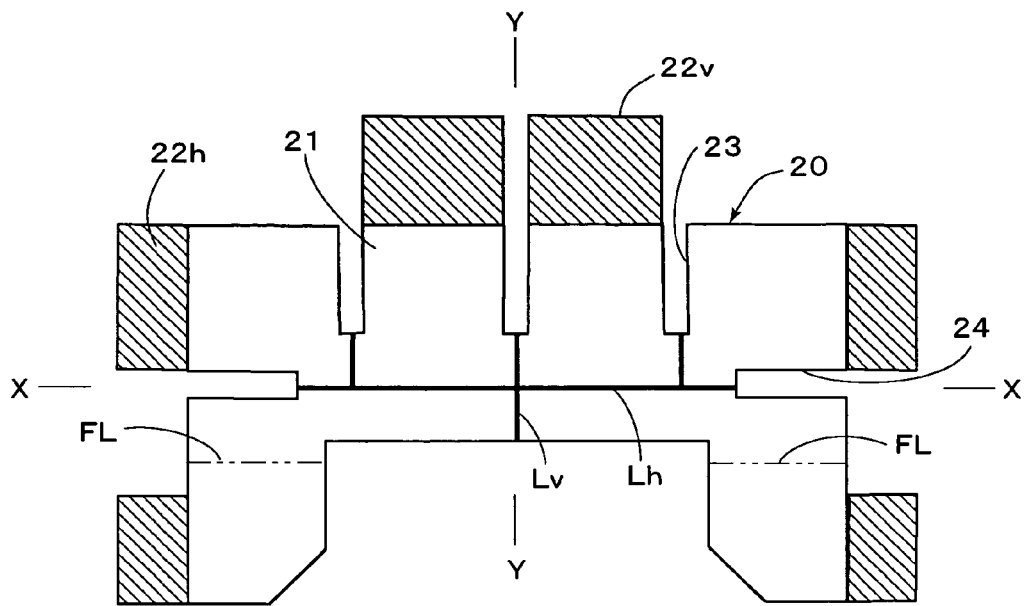
FIG. 4 is a plan view of an example showing a shape of a protective tape before it is adhered to a housing, according to an embodiment of the present invention.

A protective tape 20 is adhered to the housing 10 to cover each opening 13 and 14. The protective tape 20 is a sheet of planar member as shown in FIG. 4, before it is adhered to the housing 10. For example, may be used such a tape member that adhesive agent (not shown) of polyacrylic ester copolymer is painted on a surface base material (not shown) of a transparent polyester film, and adhered to a base sheet (not shown) of the transparent polyester film. When the protective tape 20 is adhered to the housing 10, the base sheet is removed from the tape member, and adhered to the planar portion 11 to cover each opening 13, then folded as shown in FIG. 1, and then adhered to the planar portion 12 to cover each opening 14. In FIGS. 1-3, the openings 13 and 14 visually observed through the protective tape 20 are indicated by broken-line circles. However, the protective tape 20 may be formed by opaque material, and circles may be printed in advance on its surface at such portions that the openings 13 and 14 are positioned after it was adhered. In addition, signs or symbols, even letters or sentences may be printed in advance on the surface of the protective tape 20. As for the protective tape, various shapes and styles may be employed, as shown in FIGS. 5-14, and will be described later.

The protective tape 20 is cut by a laser beam as indicated by a broken line in FIG. 1, which is emitted from a laser head of a $CO_2$ laser device (not shown), for example, on one planar portion (the planar portion 11 in FIG. 1 out of the two planar portions 11 and 12), to be separated into each part for covering the opening 13 and 14. According to the present embodiment, straight cutting lines are provided, as indicated by "Lh" and "Lv" in FIGS. 1, 2 and 4, such that a horizontal cutting line Lh and vertical cutting lines Lv are orthogonal to each other on the planar portion 11. In FIGS. 2 and 4-14, the horizontal direction is indicated by X-X, and the vertical direction is indicated by Y-Y. Thus, as both of the cutting lines Lh and Lv are placed on the same planar surface 11, the laser head 2 is enough to be movable on the single plane to cut the protective tape 20. Comparing this case with such a case that the two planar portions 11 and 12 are cut by the laser beam, respectively, therefore, working efficiency is relatively high in this case, and working time is relatively short as well. In FIG. 4, the cutting lines Lh and Lv are indicated by thick solid lines, while they are not necessarily to be printed. It may be simply constituted such that the laser head 2 is movable along the cutting lines Lh and Lv.

According to the present embodiment, the protective tape 20 is formed with grip portions integrally to extend from each separated part 21, which is separated by each of the openings 13 and 14 of the two planar portions 11 and 12. The grip portions are indicated by hatching, and indicated by 22h to represent the horizontal grip portions, and indicated by 22v to represent the vertical grip portions, respectively. The grip portions 22h and 22v are formed with only the aforementioned surface base material, so that the grip portions 22h and 22v can be gripped by hands to remove each separated part 21. Or, depending upon manufacturing facility or cost, it may be so constituted that the aforementioned adhesive agent is painted on the whole surface of the protective tape 20 including the grip portions 22h and 22v, and adhered to the aforementioned base sheet, and that the base sheet is remained to be adhered only to the grip portions 22h and 22v, when the protective tape 20 is adhered to the housing 10. Furthermore, according to the present embodiment, the protective tape 20 is formed with vertical cutout portions (represented by 23) and horizontal cutout portions (represented by 24), as shown in FIG. 4, to provide the cutting lines Lh and Lv as short as possible, and thereby to shorten the laser working time. In the figures, a portion of the protective tape 20 to be folded when the protective tape 20 is adhered to the housing 10 is indicated by a folding line FL of two-dot chain line.

In the case where the protective tape 20 formed as shown in FIG. 4 is fixed to the housing 10, two steps are performed as follows. One is the step for adhering the protective tape 20 to the housing 10, so as to cover each of the openings 13 and 14 on the two planar portions 11 and 12. The other one is the step for cutting the protective tape 20 by the laser beam on only one planar portion (the planar portion 11 in the present embodiment out of the two planar portions 11 and 12), to be separated into each part for covering the opening 13 and 14, after the adhering step.

Figure 5:
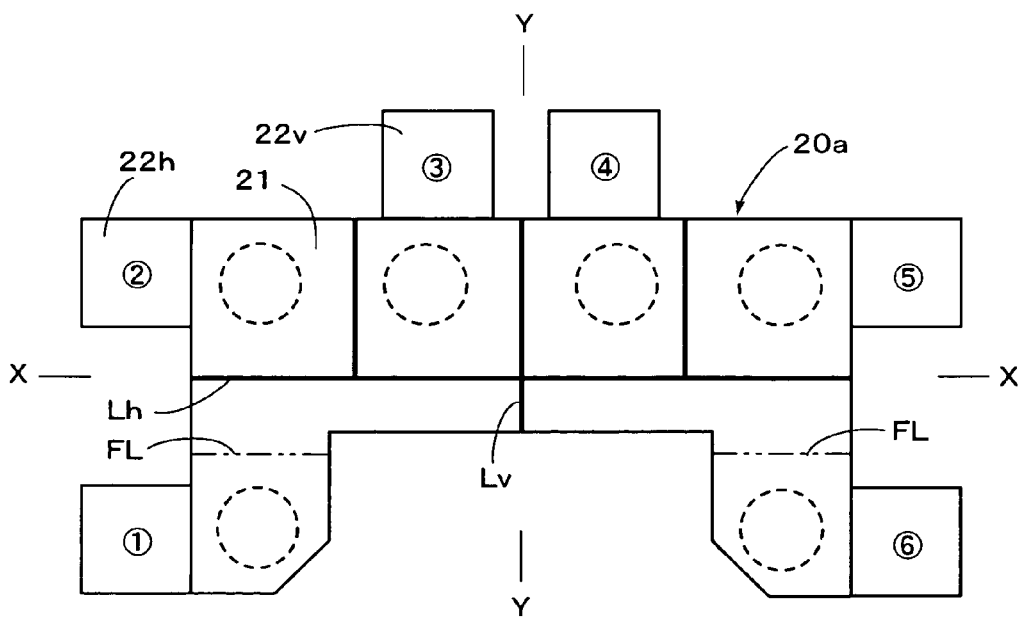
FIG. 5 is a plan view of another example showing a shape of a protective tape before it is adhered to a housing, according to an embodiment of the present invention.

FIG. 5 shows a shape of a protective tape 20a without the cutout portions 23 and 24 being formed, before it is adhered to the housing 10, so that the cutting lines Lh and Lv are relatively long comparing with the protective tape 20 as shown in FIG. 4. If consecutive numbers (1-6) are put on the grip portions 22h and 22v, as shown in FIG. 5, the step for separating the protective tape 20a into each separated part 21 can be performed accurately. Therefore, the consecutive numbers may be put on the protective tape 20 in FIG. 4, as well. Of course, together with the consecutive numbers, or, in addition to the consecutive numbers, signs, symbols, letters, sentences or the like may be printed on the grip portions 22h and 22v, or other portions.

Figure 6:
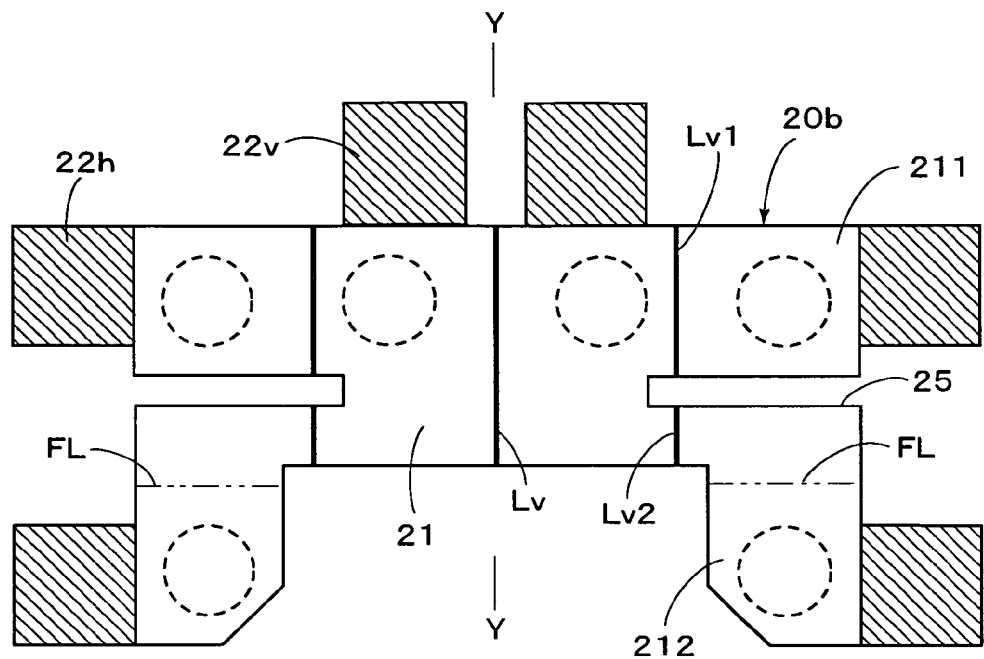
FIG. 6 is a plan view of a further example showing a shape of a protective tape before it is adhered to a housing, according to an embodiment of the present invention.

Next, as shown in FIG. 6, a protective tape 20b is formed with a pair of cutout portions (represented by 25), by which the opposite cutting lines are divided, so that the separated part 211 at the side of planar portion 11 is separated by a cutting line Lv1, and the separated part 212 at the side of planar portion 12 is separated by a cutting line Lv2. As the protective tape 20b is formed with only the vertical cutting lines Lv1 and Lv2, directions for moving the laser head 2 in operation can be simplified to be of only a predetermined direction, i.e., vertical direction in FIG. 6.

Figure 7:
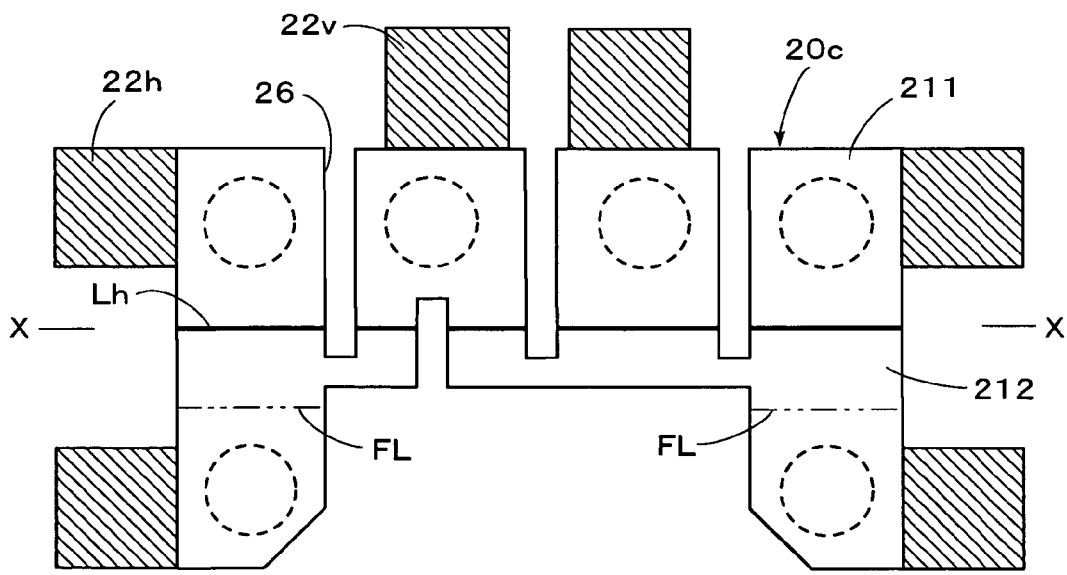
FIG. 7 is a plan view of a further example showing a shape of a protective tape before it is adhered to a housing, according to an embodiment of the present invention.

Also, as shown in FIG. 7, a protective tape 20c is formed with four vertical cutout portions (represented by 26), by which the cutting line Lh is divided into five sections, so that the separated part 211 at the side of planar portion 11 and the separated part 212 at the side of planar portion 12 are separated by the cutting line Lh. Thus, as the protective tape 20c is formed with only the horizontal cutting line Lh, directions for moving the laser head 2 in operation can be simplified to be of only a predetermined direction, i.e., horizontal direction in FIG. 7.

Figure 8:
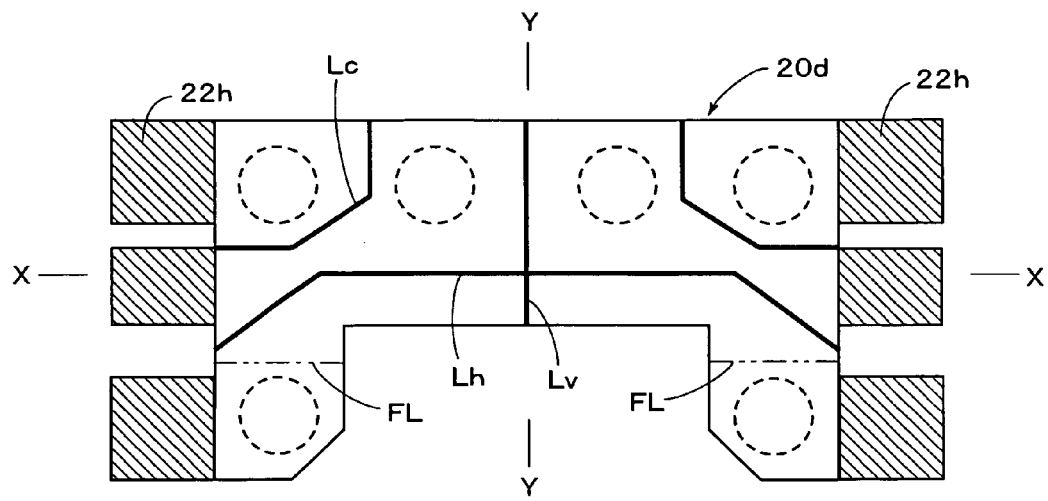
FIG. 8 is a plan view of a yet further example showing a shape of a protective tape before it is adhered to a housing, according to an embodiment of the present invention.

Furthermore, as shown in FIG. 8, a protective tape 20d is formed with the grip portion 22h to extend from each separated part 21, in such a direction as being apart from the opposite ends of the portions to be adhered to the two planar portions 11 and 12. That is, the vertical grip portion 22v is omitted, and only the horizontal grip portion 22h is provided. As a result, the dimension in the width direction, i.e., the vertical direction in FIG. 8, is minimized, whereby the material of the protective tape can be minimized. In this case, although the laser head 2 can be moved only on one planar surface, it is required to move the laser head 2 along an inclined cutting line Lc, for example. In this case, therefore, it is impossible to meet the requirement for moving the laser head 2 on the one planar surface, by moving the laser head 2 only in the horizontal direction and the vertical direction. However, it is possible to meet the requirement by means of parallel movement of the laser head 2 with respect to the X-axis and Y-axis.

Figure 9:
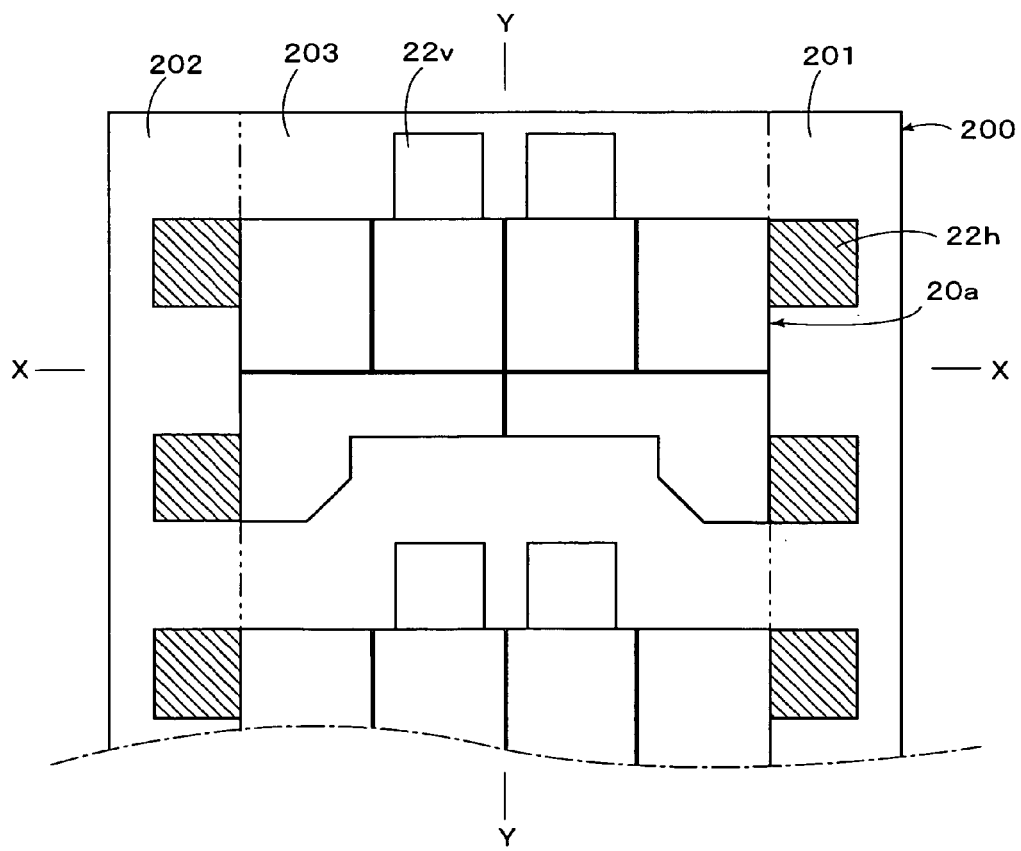
FIG. 9 is a plan view showing an example of an extended state of a roll member for continuously forming protective tapes for use in an embodiment of the present invention.
Figure 10:
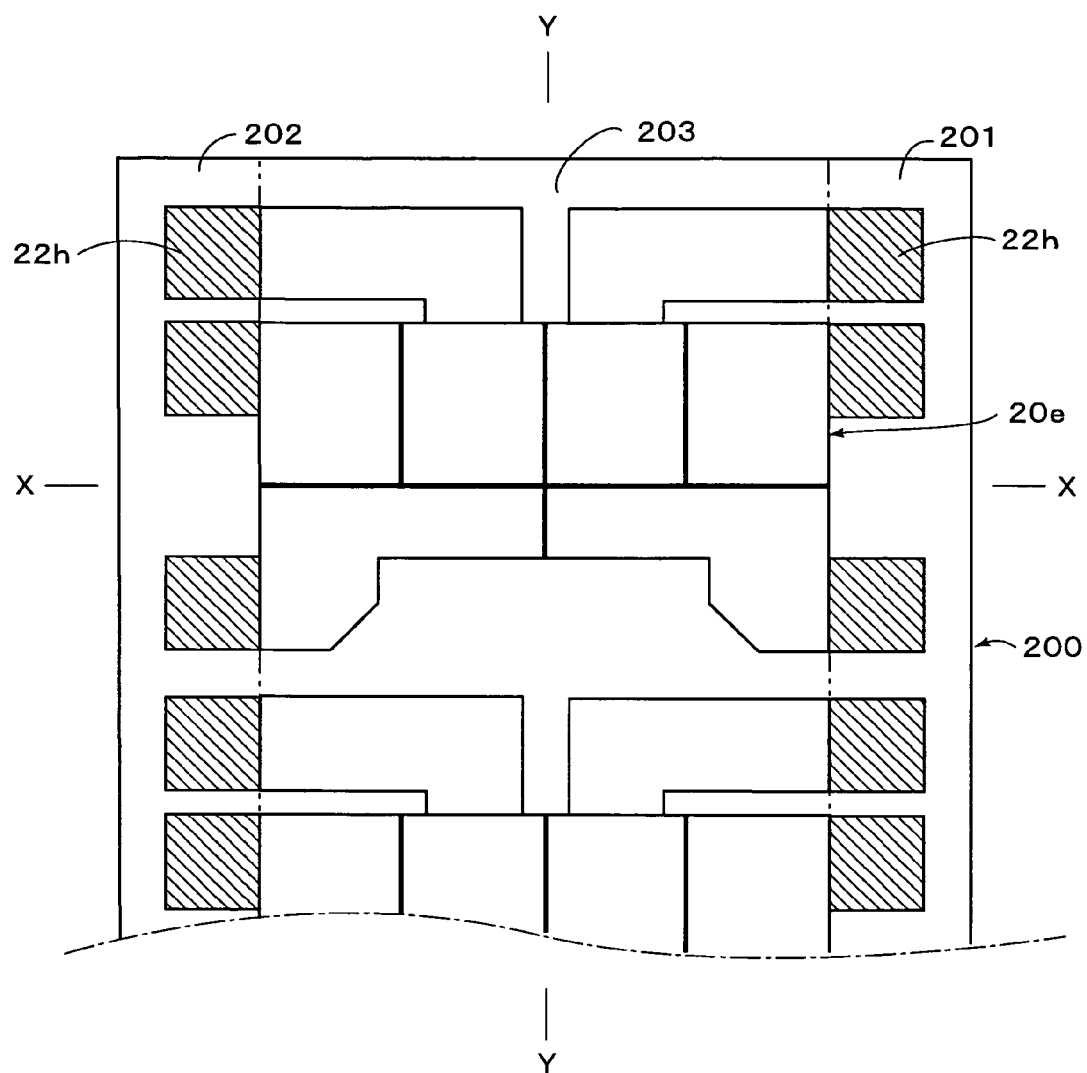
FIG. 10 is a plan view showing another example of an extended state of a roll member for continuously forming protective tapes for use in an embodiment of the present invention.

The protective tapes as shown in FIGS. 4-7 are formed with the horizontal grip portion 22h and vertical grip portion 22v, respectively. Therefore, in the case where the protective tape 20a as shown in FIG. 5, for example, is formed (stamped) consecutively, from a roll member with the material including the aforementioned tape material being rolled up, the vertical grip portion 22v is to be placed in the middle of width of a roll member 200 in the extended state thereof, as shown in FIG. 9. Provided that a portion 203 in the middle of width of the roll member 200 is formed with the tape material including the aforementioned adhesive agent, and the opposite ends are formed with only the aforementioned surface base material to provide end portions 201 and 202, the horizontal grip portion 22h indicated by hatching will be the one without the adhesive agent, but the vertical grip portion 22v without hatching will be the one with the aforementioned tape material as it is. As a result, each grip portion 22v will include unnecessary adhesive agent and base sheet.

Figure 11:
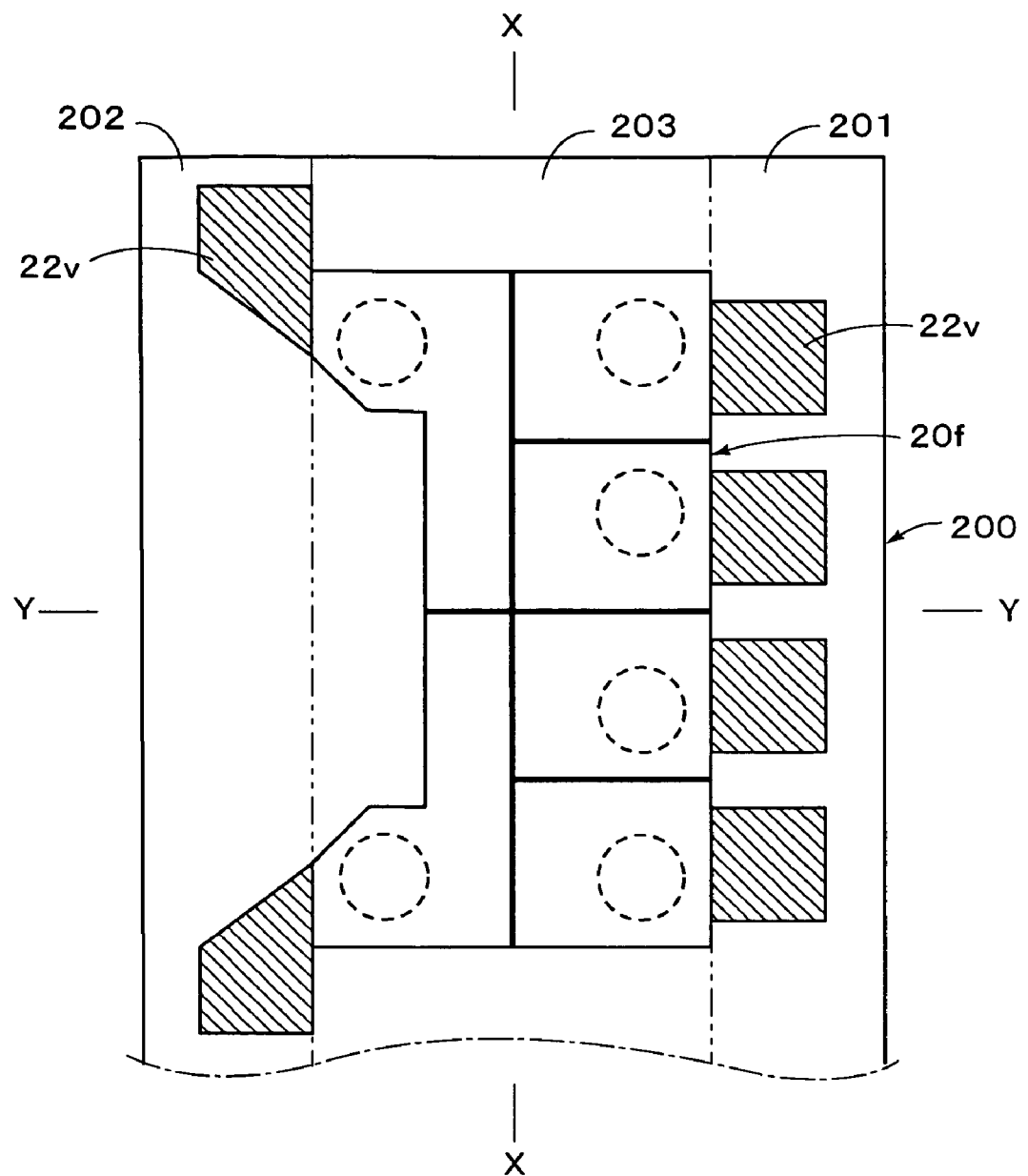
FIG. 11 is a plan view showing a further example of an extended state of a roll member for continuously forming protective tapes for use in an embodiment of the present invention.

In order to avoid such problem as described above, as shown in FIG. 10, it may be so constituted that the horizontal grip portion 22h is formed integrally to extend from each separated part 21, in such a direction as being apart from the opposite ends of the portions to be adhered to the two planar portions 11 and 12, and that a protective tape 20e, with the vertical grip portion 22v being omitted, and with only the horizontal grip portion 22h being provided, is consecutively formed from the roll member 200. Or, as shown in FIG. 11, it may be so constituted that a protective tape 20f, with the protective tape 20a as shown in FIG. 9 being rotated by 90 degree, and with only the vertical grip portion 22v being provided, is consecutively formed from the roll member 200. In FIG. 11, X-X and Y-Y indicate the directions for the protective tape 20f.

Figure 12:
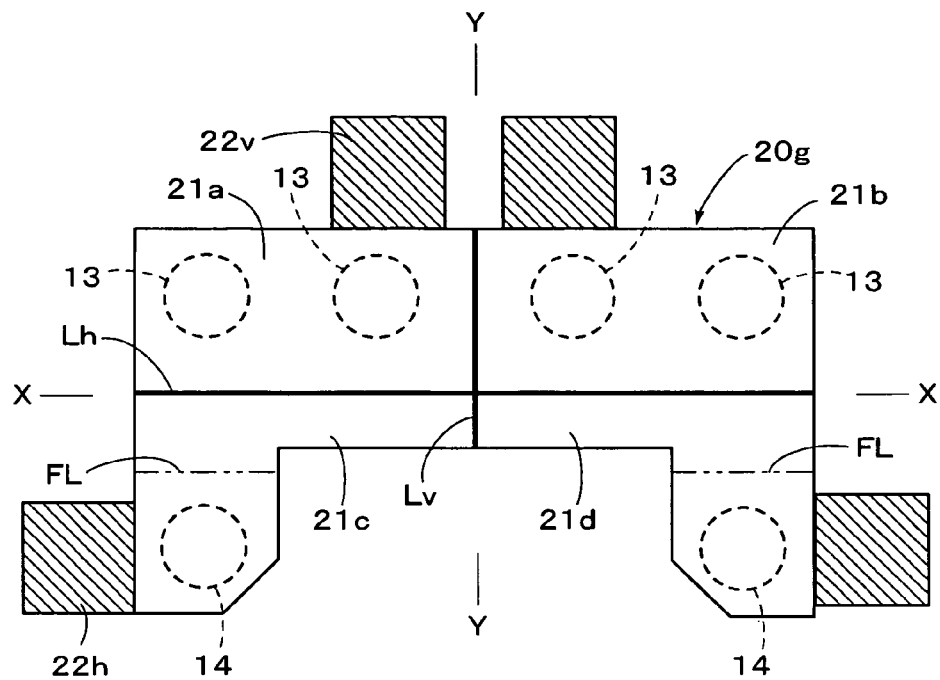
FIG. 12 is a plan view of another example showing a shape of a protective tape before it is adhered to a housing, according to an embodiment of the present invention.

Any one of the aforementioned protective tapes is to be cut out, so as to be separated into each part for covering each opening on the one planar portion 11. Instead, it may be so constituted as to be separated into a part for covering at least two openings, or separated into a part for covering one opening and a part for covering at least two openings. For example, as shown in FIG. 12, a protective tape 20g is separated by the cutting lines Lv and Lh into parts 21a and 21b for covering two openings (13, 13), and parts 21c and 21d for covering one opening (14).

Figure 13:
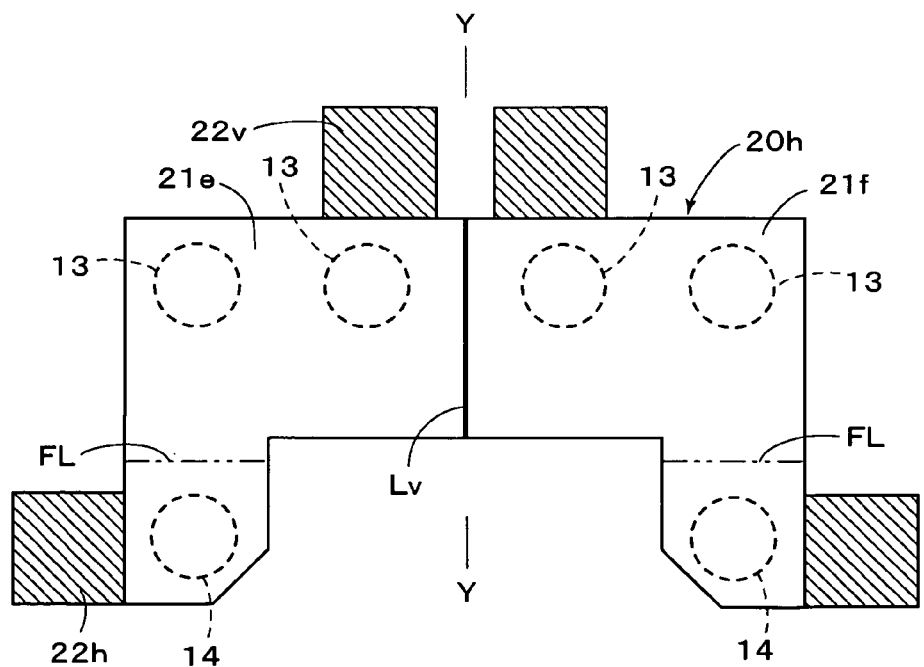
FIG. 13 is a plan view of a further example showing a shape of a protective tape before it is adhered to a housing, according to an embodiment of the present invention.
Figure 14:
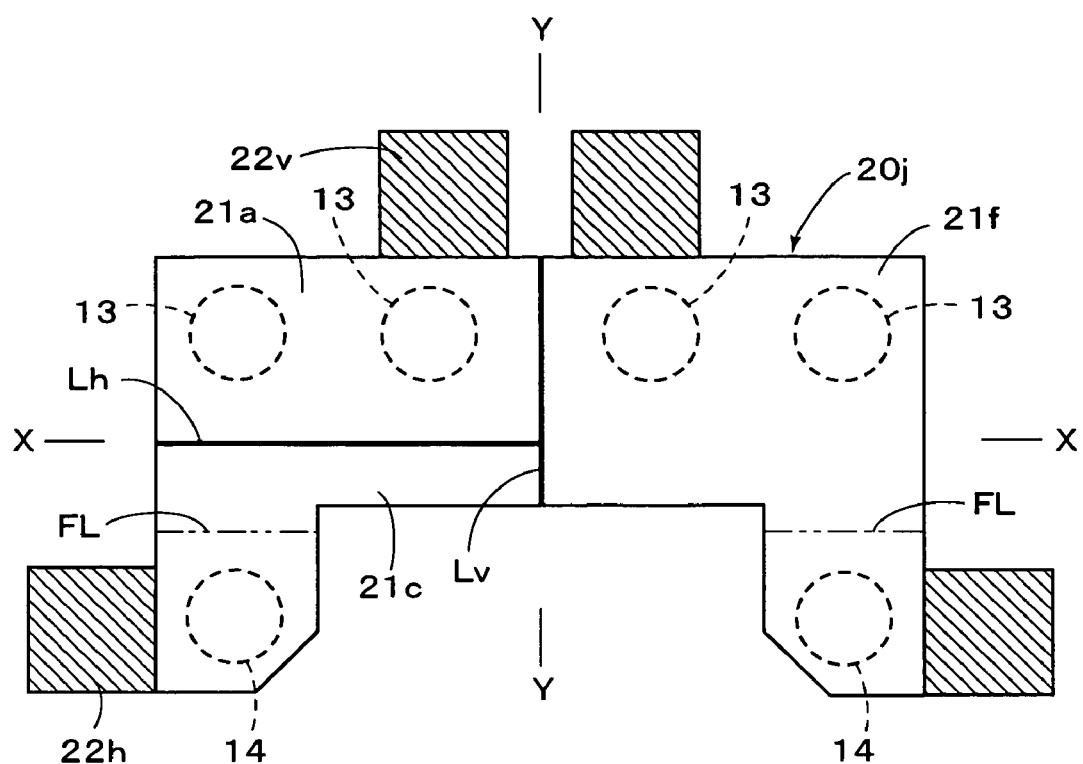
FIG. 14 is a plan view of a yet further example showing a shape of a protective tape before it is adhered to a housing, according to an embodiment of the present invention.

Or, it may be so constituted as shown in FIG. 13, wherein a protective tape 20h is separated by the cutting line Lv into parts 21e and 21f for covering three openings (13, 13, 14), respectively. According to the protective tape 20h, its one part for covering three openings (13, 13, 14), which extend to the two planar portions 11 and 12, can be divided into two parts. Furthermore, it may be so constituted as shown in FIG. 14, wherein a protective tape 20j is separated by the cutting lines Lv and Lh into the part 21c for covering the one opening (14), the part 21a for covering the two openings (13, 13), and the part 21f for covering the three openings (13, 13, 14). Any one of the protective tapes as shown in FIGS. 12-14 is formed with the grip portions 22h and 22v.

As described above, according to the present invention, as the protective tape is adhered to the two planar portions so as to cover each opening formed on the two planar portions, and the protective tape is cut to be separated into at least each one of the part for covering the opening, the protective tape can be separated into a desirable part to be removed, easily and certainly. Particularly, as the perforated line or the like has not been provided in advance on the protective tape itself according to the present invention, it is not required to prepare various kinds of tapes depending on the positions of the openings formed on the housing. In most cases, it is sufficient for the present invention that only a single kind of protective tape is provided for various kinds of hydraulic unit. As a result, the protective tape can easily meet various requirements such as a general purpose, mass production, easy distribution, reduction in working time and waste material, cost down, and so on.

According to the present invention, the hydraulic unit is not limited to the hydraulic pressure unit for vehicles as described above, but may be embodied various devices such as a pneumatic pressure unit, hydraulic pipe connecting unit or the like. In the embodiments as described above, each separated part 21 is to be separated by the laser beam emitted from the laser head 2. Instead, a heating device, blade or the like may be used for the device for cutting the protective tape 20 or the like adhered to the housing 10.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic unit comprising:
    a housing having two planar portions neighboring at a predetermined angle between said two planar portions, with at least one opening being formed on a first planar portion of said two planar portions and at least one opening being formed on a second planar portion of said two planar portions; and
    a protective tape having a portion adhered to said two planar portions of said housing, said portion being cut along a cutting line into a plurality of separate parts including a part for covering at least one opening on said first planar portion and a part for covering at least one opening on said second planar portion,
    wherein said protective tape is provided with a plurality of grip portions, each respective one of said plurality of grip portions being formed integrally with and extending outward of a respective one of said plurality of separate parts,
    wherein a space is formed between two of said grip portions which extend in a common outward direction, and at least a part of the cutting line is connected to said space.

2. A hydraulic unit as set forth in claim 1, wherein said protective tape is formed with two of said plurality of grip portions extending from opposite ends of the portion adhered to said two planar portions, in a direction to be apart from each other.

3. A hydraulic unit as set forth in claim 1, wherein said portion of said protective tape is cut along said cutting line by a laser beam, and is cut on only one planar portion out of said two planar portions, into said plurality of separate parts.

4. A method for adhering a protective tape to a hydraulic unit provided with a housing having two planar portions neighboring at a predetermined angle between said two planar portions, with at least one opening being formed on a first planar portion of said two planar portions and at least one opening being formed on a second planar portion of said two planar portions, comprising:
    adhering a portion of said protective tape to said two planar portions of said housing; and
    cutting said portion along a cutting line into a plurality of separate parts including a part for covering at least one opening on said first planar portion and a part for covering at least one opening on said second planar portion,
    wherein, prior to cutting said portion along said cutting line, said protective tape is cut to provide a plurality of grip portions whereby each respective one of said plurality of grip portions is formed integrally with and extends outward of a respective one of said plurality of separate parts,
    wherein a space is formed between two of said grip portions which extend in a common outward direction, and at least a part of the cutting line is connected to said space.

5. A method for adhering a protective tape to a hydraulic unit as set forth in claim 4, wherein said protective tape is formed with two of said plurality of grip portions extending from opposite ends of the portion adhered to said two planar portions, in a direction to be apart from each other.

6. A method for adhering a protective tape to a hydraulic unit as set forth in claim 4, wherein said portion of said protective tape is cut along said cutting line by a laser beam, and is cut on only one planar portion out of said two planar portions, into said plurality of separate parts.

* * * * *